US007653503B2

(12) United States Patent  (10) Patent No.: US 7,653,503 B2
Mangalam et al.  (45) Date of Patent: Jan. 26, 2010

(54) TEMPERATURE-COMPENSATING SENSOR SYSTEM

(75) Inventors: Arun S. Mangalam, Williamsburg, VA (US); Siva M. Mangalam, Williamsburg, VA (US)

(73) Assignee: Tao of Systems Integration, Inc., Hampton, VA (US)

(*) Notice: Subject to any disclaimer, the term of this patent is extended or adjusted under 35 U.S.C. 154(b) by 287 days.

(21) Appl. No.: 11/737,831

(22) Filed: Apr. 20, 2007

(65) Prior Publication Data

US 2007/0250276 A1    Oct. 25, 2007

Related U.S. Application Data

(60) Provisional application No. 60/793,381, filed on Apr. 20, 2006.

(51) Int. Cl.
*G01F 25/00* (2006.01)
*G01F 1/68* (2006.01)
*G01F 1/69* (2006.01)
*G06F 19/00* (2006.01)

(52) U.S. Cl. ............... 702/100; 73/204.11; 73/204.17; 73/204.18; 73/204.19; 73/204.23; 73/204.25; 73/861; 374/45; 702/45; 702/50; 702/53; 702/85; 702/104; 702/133; 702/136; 702/187; 702/189

(58) Field of Classification Search ............. 73/170.01, 73/170.11, 170.12, 202, 205.5, 204.11, 204.15, 73/204.16, 204.17, 204.18, 204.19, 204.23, 73/204.25, 204.26, 204.27, 861; 374/45, 374/100, 101, 102; 702/1, 33, 45, 47, 50, 702/53, 85, 88, 96, 100, 104, 127, 130, 133, 702/136, 187, 188, 189

See application file for complete search history.

(56) References Cited

U.S. PATENT DOCUMENTS 2,726,546 A * 12/1955 King, Jr. ................. 73/204.15

(Continued)

FOREIGN PATENT DOCUMENTS

DE         3706622 A1 *  9/1988

OTHER PUBLICATIONS

Bellhouse et al: "Determination of mean and dynamic skin friction, separation and transition in low-speed flow with a thin-film heated element", J. Fluid Mech. (1966), vol. 24, part 2, pp. 379-400.*

(Continued)

*Primary Examiner*—Edward R Cosimano
(74) *Attorney, Agent, or Firm*—Hunton & Williams LLP (57) ABSTRACT

A temperature compensating fluid flow sensing system is provided that comprises a resistance-based sensor element that is included in a constant voltage anemometer circuit configured to establish and maintain a command voltage across the first sensor element and to provide a constant voltage anemometer (CVA) output voltage corresponding to the resistance change in the first sensor element due to heat transfer between the first sensor element and the fluid. A controller is configured to establish the command voltage based on a desired overheat across the sensor and an actual overheat across the first sensor element. A power dissipation (PDR) module is configured to determine at least one fluid flow parameter and an actual overheat value based at least in part on the CVA output voltage and to transmit to the controller the actual overheat for use by the controller in updating the command voltage.

18 Claims, 5 Drawing Sheets

U.S. PATENT DOCUMENTS

| | | | | |
|---|---|---|---|---|
| 2,756,594 A * | 7/1956 | Hall | ..................... | 73/204.19 |
| 2,777,325 A * | 1/1957 | Bockmeulen et al. | .... | 73/204.15 |
| 3,196,679 A * | 7/1965 | Howland | ................. | 73/204.11 |
| 3,372,590 A * | 3/1968 | Sterling | ................... | 73/204.17 |
| 3,498,127 A * | 3/1970 | Richards | ................. | 73/204.26 |
| 3,891,391 A * | 6/1975 | Boone | ................... | 73/204.18 |
| 3,988,928 A * | 11/1976 | Edstrom et al. | ......... | 73/204.19 |
| 4,202,218 A | 5/1980 | Romo | | |
| 4,297,881 A * | 11/1981 | Sasayama et al. | ........ | 73/204.14 |
| 4,337,665 A | 7/1982 | Sato et al. | | |
| 4,363,243 A | 12/1982 | Poff | | |
| 4,373,387 A * | 2/1983 | Nishimura et al. | ....... | 73/204.19 |
| 4,450,719 A * | 5/1984 | Nishimura et al. | ....... | 73/204.15 |
| 4,478,076 A * | 10/1984 | Bohrer | ................... | 73/204.16 |
| 4,478,077 A * | 10/1984 | Bohrer et al. | ........... | 73/204.26 |
| 4,490,803 A * | 12/1984 | Briggs | ......................... | 702/99 |
| 4,501,144 A * | 2/1985 | Higashi et al. | ........... | 73/204.26 |
| 4,562,731 A * | 1/1986 | Nishimura et al. | ......... | 73/202.5 |
| 4,566,310 A * | 1/1986 | Cohen et al. | ...................... | 73/9 |
| 4,581,929 A * | 4/1986 | Sugiura | ................... | 73/204.15 |
| 4,596,140 A * | 6/1986 | Dorman et al. | ........... | 73/204.18 |
| 4,691,566 A * | 9/1987 | Aine | ........................ | 73/204.26 |
| 4,807,151 A * | 2/1989 | Citron | ......................... | 702/47 |
| 4,843,445 A * | 6/1989 | Stemme | ................... | 73/204.26 |
| 4,845,984 A * | 7/1989 | Hohenstatt | ............... | 73/204.15 |
| 4,854,167 A * | 8/1989 | Czarnocki et al. | ........ | 73/204.19 |
| RE33,076 E * | 10/1989 | Sugiura | ................... | 73/204.15 |
| 5,063,352 A * | 11/1991 | Kleinhans | ................... | 324/706 |
| 5,074,147 A | 12/1991 | Sarma | | |
| 5,218,863 A * | 6/1993 | Mangalam | .................. | 73/147 |
| 5,359,891 A * | 11/1994 | Yamamoto et al. | ....... | 73/204.15 |
| 5,361,637 A | 11/1994 | Judd et al. | | |
| 5,493,100 A * | 2/1996 | Renger | ...................... | 219/497 |
| 5,509,306 A * | 4/1996 | Yamamoto et al. | ....... | 73/204.15 |
| 5,854,425 A | 12/1998 | Sarma | | |
| 5,861,556 A * | 1/1999 | Nukui et al. | ............. | 73/204.17 |
| 6,098,455 A * | 8/2000 | Nukui et al. | ............. | 73/204.26 |
| 6,134,959 A * | 10/2000 | Mangalam et al. | ....... | 73/170.12 |
| 6,147,312 A | 11/2000 | Lockery | | |
| 6,417,678 B2 | 7/2002 | Furukawa | | |
| 6,536,273 B2 * | 3/2003 | Schrittenlacher | ......... | 73/204.11 |
| 6,681,625 B1 * | 1/2004 | Berkcan et al. | .......... | 73/204.23 |
| 6,729,183 B2 * | 5/2004 | Tanimoto et al. | ......... | 73/204.26 |
| 6,769,298 B2 * | 8/2004 | Matsumura et al. | ...... | 73/204.15 |
| 6,782,743 B2 * | 8/2004 | Koike et al. | ................. | 73/202.5 |
| 6,786,088 B2 * | 9/2004 | Matsumura | .............. | 73/204.15 |
| 6,826,493 B1 | 11/2004 | Mangalam | | |
| 6,889,544 B2 * | 5/2005 | Tanimoto et al. | ......... | 73/204.15 |
| 6,904,799 B2 * | 6/2005 | Cohen et al. | ............. | 73/204.11 |
| 6,963,810 B2 | 11/2005 | Mangalam | | |
| 7,003,418 B2 * | 2/2006 | Bonne et al. | ................. | 702/100 |
| 7,054,767 B2 * | 5/2006 | Eldridge | ...................... | 702/50 |
| 7,132,838 B2 | 11/2006 | Sarma et al. | | |
| 7,243,538 B1 * | 7/2007 | Ramsesh | ................. | 73/204.22 |
| 2002/0178807 A1 * | 12/2002 | Tanimoto et al. | ......... | 73/204.26 |
| 2003/0146758 A1 * | 8/2003 | Koike et al. | ................. | 324/453 |
| 2003/0154781 A1 * | 8/2003 | Matsumura | .............. | 73/204.15 |
| 2004/0040377 A1 * | 3/2004 | Tanimoto et al. | ......... | 73/204.15 |
| 2004/0055374 A1 * | 3/2004 | Cohen et al. | ............. | 73/204.11 |
| 2005/0109100 A1 * | 5/2005 | Eldridge | ................... | 73/204.18 |
| 2007/0144250 A1 * | 6/2007 | Ramsesh | ................. | 73/204.22 |

OTHER PUBLICATIONS

Hanratty et al: "Chapter 9 Measurement of Wall Shear Stress", Fluid Mechanics Measurements Second Edition, Edited by Goldstein 1996, published by Taylor & Francis Publishers since 1798, pp. 575 & 624-629.*

"Demonstration of skin friction measurements feautring in situ estimation of conduction loss using constant voltage anemometers and surface hot-films", Garimella R. Sarma and Timothy R. Moes, *Review of Scientific Instruments 76, 055102* (2005 American Institute of Physics), 6 pages.

* cited by examiner

TEMPERATURE-COMPENSATING SENSOR SYSTEM

This application claims the benefit of U.S. Provisional Application No. 60/793,381, filed Apr. 20, 2006, now expired, which is incorporated herein by reference in its entirety.

FIELD OF THE INVENTION

This invention relates generally to thermal anemometry and, more particularly, to an improved thermal sensor system for monitoring fluid flow over a body surface, the system being configured to compensate for changing thermal conditions of the fluid and the body.

BACKGROUND OF THE INVENTION

A variety of instruments and electronic measuring devices rely on the measurement of resistance or changes in resistance of conductive elements disposed in a flow environment. Such instruments may include sensors that allow the determination of fluid flow rates based on heat transfer to or from a fluid stream. These may include hot-wire sensors and thin film sensors such as those described in U.S. Pat. No. 5,218,863 ("'863 patent"), U.S. Pat. No. 5,074,147 ("'147 patent"), U.S. Pat. No. 6,963,810 ("'810 patent"), U.S. Pat. No. 6,826,493 ("'493 patent"), and U.S. Pat. No. 7,132,838 ("'838 patent) al of which are incorporated herein by reference in their entireties.

Resistance-based instruments typically comprise a detector filament that may be positioned in a measurement configuration/environment. The detector element forms a part of a sensor circuit that may be used to identify changes in the resistance of the element. In anemometer devices, the detector element is a filament heated by electric current while immersed in a fluid flow stream. The passage of the fluid stream over the hot filament heats or cools the filament and consequently causes its electrical resistance to change.

In prior art flow sensor systems, the detector element was typically disposed in one arm of a Wheatstone bridge circuit and supplied with a source of electrical energy. A difference of potential, the value of which is mathematically relatable to the heat transfer from the fluid stream, appears across the measuring diagonal of the Wheatstone bridge. Bridge circuits, however, have several drawbacks that limit their use in many sensor applications. For example, in order for the circuit to provide meaningful data, the bridge must be balanced. Also, the bridge output sensitivity to resistance changes is inherently limited, thus necessitating large subsequent amplification. It is a well-known fact that such amplification will deteriorate the signal-to-noise ratio of the measured data. Finally, bridge circuits suffer greatly from electromagnetic and radio-frequency interference (EMI/RFI) especially with flow sensors exposed to the environment.

In prior art fluid flow measurement systems incorporating temperature-compensation (e.g., U.S. Pat. Nos. 4,807,151, 4,845,984, 4,566,310, 4,490,803, 5,063,352, 7,003,418), the bridge circuit is primary used. As a result, they all suffer from the issues previously mentioned, and cannot resolve these issues without significant compromises in sensitivity bandwidth or circuit complexity.

SUMMARY OF THE INVENTION

An aspect of the invention provides a temperature compensating fluid flow sensing system comprising a first resistance-based sensor element positionable in a fluid flow stream. The first sensor element has a sensor resistance that varies with fluid flow conditions based on heat transfer between the first sensor element and the fluid. The first sensor element is included in a first constant voltage anemometer circuit configured to establish and maintain a command voltage across the first sensor element and to provide a CVA output voltage corresponding to the resistance change in the first sensor element due to heat transfer between the first sensor element and the fluid. The system further comprises a controller in communication with the first constant voltage anemometer circuit. The controller is configured to establish the command voltage based on a desired overheat across the sensor and an actual overheat across the first sensor element. The system also comprises a PDR module in communication with the first constant voltage anemometer circuit and the controller. The PDR module is configured to receive the CVA output voltage and the command voltage from the first constant voltage anemometer circuits to determine at least one fluid flow parameter and an actual overheat value based at least in part on the CVA output voltage from the first constant voltage anemometer, and to transmit to the controller the actual overheat for use by the controller in updating the command voltage.

Another aspect of the invention provides a method of establishing a fluid flow parameter using a temperature compensating sensor system. The temperature compensating sensor system has a first resistance-based sensor element in a first constant voltage anemometer circuit and a controller configured to establish a voltage to be maintained across the first sensor element by the first constant voltage anemometer circuit. The method comprises selecting and providing to the controller a desired overheat, determining a cold resistance value for the first sensor element and calculating a required hot sensor resistance for the desired overheat. The method further comprises establishing and maintaining the desired overheat across the first sensor element under zero-flow conditions and determining a zero-flow power dissipated and a zero-flow resistance for the first sensor element with the desired overheat established under zero-flow conditions. The method still further comprises establishing and maintaining the desired overheat across the first sensor element under a set of flow conditions and determining a flow power dissipated and a flow resistance for the first sensor element with the desired overheat established under the flow conditions. The method also comprises calculating the fluid parameter at least in part based on the flow and zero-flow power and the flow and zero-flow resistance values for the first sensor element.

DETAILED DESCRIPTION OF THE INVENTION

The present invention provides temperature-compensated fluid flow sensor systems that automatically compensate for sensor resistance variations due to changes in ambient temperature and for heat conduction loss to the substrate. Although the following text discusses the invention in the context of air or similar gases, it will be understood that the methods and systems of the invention are applicable to any fluid regime in which resistance-based sensors may be used for flow measurement. Therefore the term "anemometer" as used herein refers to devices for the measurement of fluid flow generally and is not limited to devices for measuring the speed or force of air or other gases.

The methods and systems of the invention use resistance-based sensor elements in Constant Voltage Anemometer (CVA) circuitry to provide sensor output corresponding to the heat transfer between the fluid and the surface upon which the sensor is applied. As described in the '147 patent, a CVA provides this output by adjusting to maintain a constant voltage across the sensor element. The systems of the present invention go one step further by placing the CVA in a controlled feedback loop that allows the "constant" voltage across the sensor to be varied to compensate for changes in the heating conditions or losses. The result is a temperature-compensated anemometer (TCA). The TCA applies heat transfer boundary conditions to control the voltage maintained across the resistance-based sensor elements by the CVA. The TCA ultimately provides an output that is a function of the power dissipated through the sensor, sensor temperature and ambient temperature.

As discussed above, the present invention compensates for changing thermal conditions of the fluid and a substrate through the use of a CVA with one or more resistance-based sensing elements. These sensing elements were previously presented in the '147 patent, which is incorporated herein by reference in its entirety. The '147 provides an alternative to the Wheatstone bridge network in disclosing a CVA. The '147 patent disclosed a sensor circuit comprising a reference voltage source, an amplifier and a T-network in which the sensor element forms the stem of the T. This circuit is configured so that the voltage across the sensor element remains constant regardless of changes in the resistance or impedance of the sensor element. The use of this circuit provided a significant improvement in sensitivity, flexibility and response while eliminating the problems created by the balancing needs of bridge circuits Despite being a significant improvement over bridge-based circuits, the T-network circuit of the '147 patent retains a degree of susceptibility to inconsistency due to changes in sensor element temperature due to ambient temperature changes and heat conduction loss to the substrate. Sarma and aloes partially addressed temperature compensation techniques for the CVA in "Demonstration of skin friction measurements featuring in-situ estimation of conduction loss using CVAs and surface hot-films," Rev. Sci. Instr., Vol. 76, No. 5, 2005. Those techniques do not address how to reliably measure flow parameters under changing flow conditions, as the sensor overheat, and consequently the heat loss to the substrate, for the CVA will be always changing with the sensor resistance. The percentage of power dissipated through heat convection for a heated sensor is 80-90% for hot-wire probes, 50-60% for micro-electro-mechanical systems (MEMNS) hot-wire, and less than 50% for hot-film sensors. As a result. if 50% of the heat loss is to the substrate and it is always changing, a significant portion of the power dissipation through the sensor is through an unknown and changing substrate heat loss leading to a large error in measurement of the power dissipation through heat convection. There is accordingly a need for fluid flow measurement systems that are substantially insensitive to these temperature effects and the heat loss to the substrate.

The TCA systems of the invention effectively reduce the above-described temperature and heat loss effects. In general, the TCAs of the invention may include a computer processor and a CVA having a resistance-based sensor element. The computer processor provides a voltage to the CVA, which maintains that voltage across the sensor element. The processor may act as or include a controller, which may be a microcontroller, to adjust this voltage based on temperature and/or heat flux measurements. The controller may be configured, in particular, to maintain a constant overheat across the sensor element to compensate for effects of ambient temperature changes on the sensor element. The controller may be configured to set the voltage to be applied to the sensor element of he CVA according to a desired sensor element temperature The CVA then applies and maintains the commanded voltage across the sensor to produce a heated sensor element resistance at a certain temperature above the ambient. The system may include a control loop to establish and maintain the desired overheat.

Figure 1:
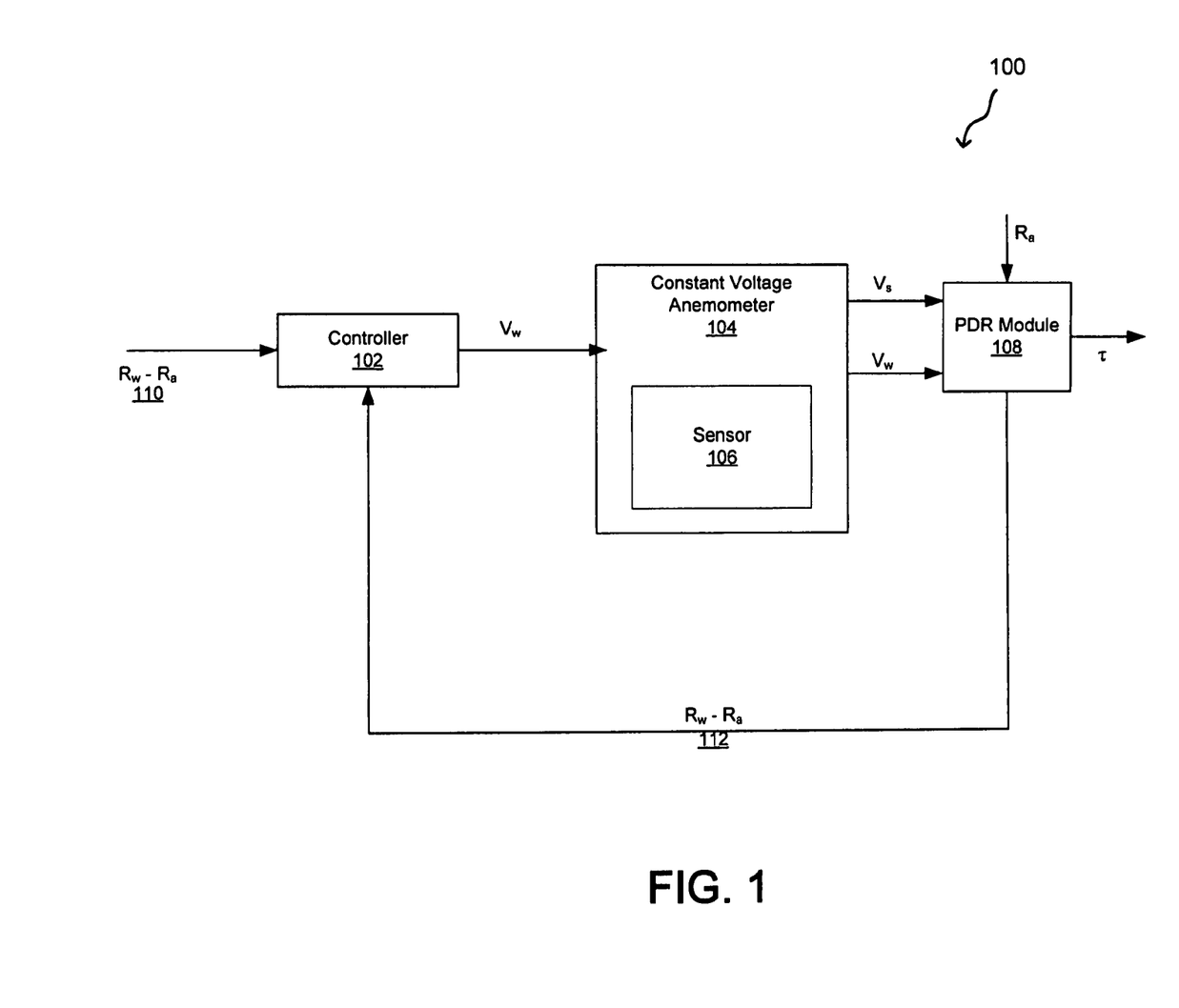
FIG. 1 is a schematic representation of a temperature-compensated sensor system according to an embodiment of the invention.

The invention will now be described in more detail with reference to FIGS. 1-6. Referring first to FIG. 1, a TCA 100 comprises a controller 102, a CVA 104 having a sensor element 106 and a PDR module 108. The controller 102 may be configured to receive from an operator a desired overheat 110 ($R_w - R_a$) that is to be maintained across a sensor element 106. The controller 102 may also be configured to determine a cold sensor element resistance value ($R_a$) and to calculate the required sensor element hot resistance ($R_w$) based on the desired overheat 110 ($R_w - R_a$) and the cold resistance ($R_a$) The cold resistance is the resistance of the sensor element at ambient temperature of the fluid if no overheat is applied The hot resistance is the resistance of the sensor element at ambient temperature of the fluid if overheat is applied. The controller 102 may be any form of or a portion of any form of data processor and may, in particular, be a microprocessor.

The sensor element 106 is installed in the circuit of the CVA 104, which is configured to receive from the controller 102 a commanded voltage ($V_w$) to be maintained across the sensor element 106. The CVA 104 may incorporate any appropriate thermal, resistance based sensor element and may, itself comprise any circuitry configured to maintain a constant voltage across the sensor element while providing an output voltage corresponding to the heat transfer due to flow over or around the sensor element. The CVA 104 may, in particular be configured as described in any of the embodiments disclosed in the '147 and '838 patents.

The CVA 104 provides an output voltage ($V_s$) and the voltage across the sensor element ($V_w$) to the PDR module 108. The PDR module 108 may be or may not be a part of the same or a different processor as the controller 102 The PDR module 108 may be configured to determine the actual overheat 112 ($R_w - R_a$) and a corresponding shear stress ($\tau$) The theory and issues related to the measurement of shear stress using hot-film sensors are described in literature [Bellhouse & Schultz (1966), Hanratty & Campbell (1996)], which is incorporated herein by reference.

The PDR module 108 determines actual overheat 112 by subtracting $R_a$ from the calculated $R_w$. The determined value $P_w/(R_w - R_a)$ is the power dissipation through heat convection and conduction to the substrate, and is referred to herein as "PDR." At no flow conditions, the control loop provides PDR0, which is the power dissipation primarily through heat conduction to the substrate since there is little convection. Under flow conditions, the control loop provides PDR. In an embodiment, the output will be proportional to a mass flow and temperature if the resistance-based sensor is a hot-wire probe. The advantage of this approach is that one sensor may be used to compensate for temperature and heat loss through the substrate or probe supports in the case of hot-wire probes.

The actual overheat 112 ($R_w-R_a$) is returned to the to the controller 102 in a feedback loop. The controller 102 may then recalculate the commanded voltage ($V_w$) based on the desired overheat 110 and the actual overheat 112. The sensor system 100 uses this loop to adjust the parameters of the CVA 104 until the output overheat 112 matches the desired overheat 110. By running the control loop, the TCA system 100 essentially keeps the sensor overheat constant. This serves to remove non-flow-related temperature effects from the shear stress output of the PDR module 108. Periodically, the sensor cold resistance may be updated by either interrupting the loop temporarily or by using another sensor element, depending on the level of temperature fluctuations.

An overheat ratio may be selected by an operator and communicated to the controller 102. The overheat ratio can be communicated to the controller 102, by among other things, a serial port or a Universal Serial Bus (USB) port. The operator may choose the overheat based on the anticipated flow rate. In some embodiments, an optimum overheat ratio for a given set of flow conditions may be established.

The TCA system of 100, applies the following expressions to perform the process described above. The following expressions can be shown to be true. The overheat ratio, as describe above, that is sufficient for flow rate that is communicated to the controller is equivalent to $$a_w = \frac{R_w - R_a}{R_a},$$

where $R_w-R_a$ is the overheat and $R_a$ is the cold resistance of the sensor element. This equation is related to $\Delta T=T_w-T_a$, where $T_w$ is the sensor temperature and $T_a$ is the ambient temperature.

For a metallic resistance element such as a hot-film, $\Delta T$ is equivalent to $$\Delta T = \frac{R_w - R_a}{\alpha R_0} \quad (Eq. 1)$$

where a is the temperature coefficient of resistance (TCR), $R_0$ is the resistance at a reference temperature. $T_0$, $R_a$ is the "cold resistance" of the hot-film sensor, and $R_w$ is the "hot resistance" of the hot-film sensor. The values for a and $R_0$ are assumed to be constants. The sensor resistance, $R_w$, is a function of $V_w$, voltage across the sensor, and $V_s$, the CVA output voltage.

The calculation performed by the controller to determine the required sensor element hot resistance for the desired overheat is equivalent to $R_w=a_w R_a + R_a$.

A commonly used formula for relating hot-film parameters to shear stress is $$\frac{P_w}{\Delta T} = A + B\tau^{1/3} \quad (Eq. 2)$$

Inserting Eq. 1 into Eq. 2 and allowing A and B to absorb any constants provides the following equation for PDR:

$$PDR = \frac{P_w}{R_w - R_a} = A + B\tau^{1/3} \quad (Eq. 3)$$

Subtracting PDR0 from PDR at flow conditions eliminates the constant A in Eq. 3. The calculated output (PDR-PDR0)³, is proportional to τ, the shear stress.

Figure 2:
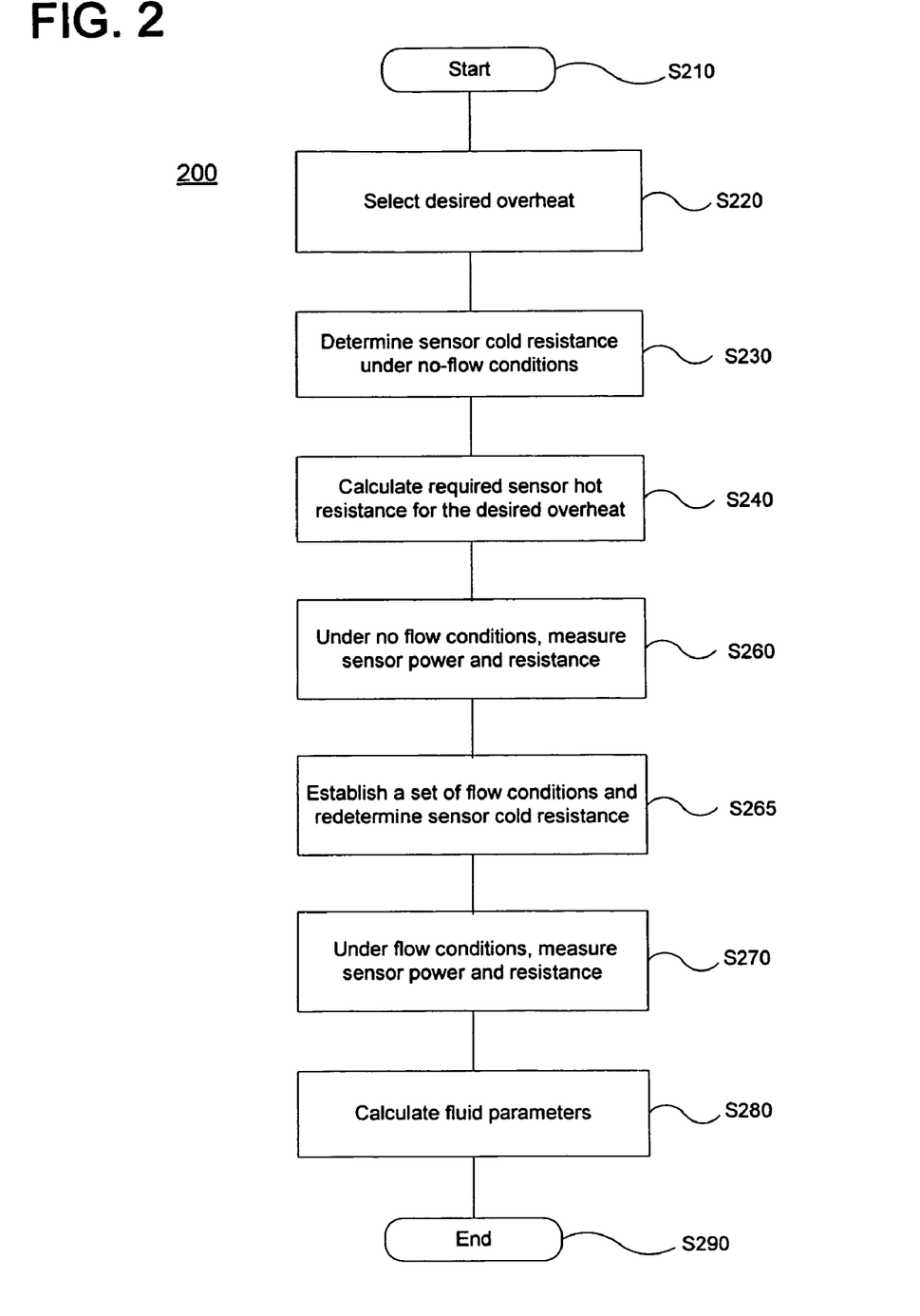
FIG. 2 illustrates a flow diagram of a method of obtaining a temperature-compensated flow measurement according to an embodiment of the invention.

FIG. 2 illustrates a flow diagram of a method 200 of obtaining a temperature-compensated flow measurement using a TCA system such as that described in FIG. 1. The TCA system includes a sensor element that may be selectively subjected to fluid flow conditions. In particular embodiments, the sensor element may be a thin film sensor applied to the surface of a body. The method 200 begins at S210 and at S220 an overheat ratio to be applied to the sensor element is selected. An overheat ratio sufficient for flow rate may be selected by an operator and communicated to the controller of the TCA system. At S230, the sensor-element cold resistance is measured. This may be accomplished by a controller or PDR module of the TCA system or by a combination of the PDR module and the controller. The cold resistance of the sensor element (Ra) can be measured in several ways. First, the controller can set the CVA voltage low such that a small amount of current is passed through the sensor element. The hot resistance of the sensor element is then determined from the actual voltage across the sensor and the CVA output voltage. This method can be applied on the same sensor element or on another co-located sensor element exposed to the same temperature environment. Second, the controller can set several voltages across the sensor element, one at a time. The power dissipated through the sensor element and the hot resistance of the sensor element can then be calculated by the PDR module. This data can then be used to obtain a polynomial fit of the hot resistance of the sensor element versus the power dissipated through the sensor element. This method assumes the ambient temperature does not change substantially when the different voltages are applied. Lastly, the controller can obtain a temperature measurement from a co-located temperature sensor element, not necessarily resistive, and estimate the cold resistance based on the knowledge of the temperature coefficient of resistance and the resistance at a reference temperature for the sensor element.

At S240, the sensor-element hot resistance needed for the desired overheat is calculated by the system controller based on the desired overheat and the cold resistance. At S260, the power dissipated and the resistance of the sensor element are measured under no-flow conditions. This is accomplished by determining and applying to the CVA an initial command voltage, then using the measured overheat to continually update the command voltage to achieve and maintain the desired overheat. With the desired overheat established, the output of the CVA can be used to determine the sensor's no-flow power and resistance. At S265, a set of flow conditions are established and the sensor-element cold resistance is remeasured. At S270, the power dissipated and the resistance of the sensor element are remeasured. This is accomplished once again by determining and applying to the CVA an initial command voltage, then using the measured overheat to continually update the command voltage to achieve and maintain the desired overheat. With the desired overheat established, the output of the CVA can be used to determine the sensor elements power and resistance under flow conditions. At S280, the fluid parameters are calculated from the flow and no-flow measurements as described above. The method ends at S290.

Figure 3:
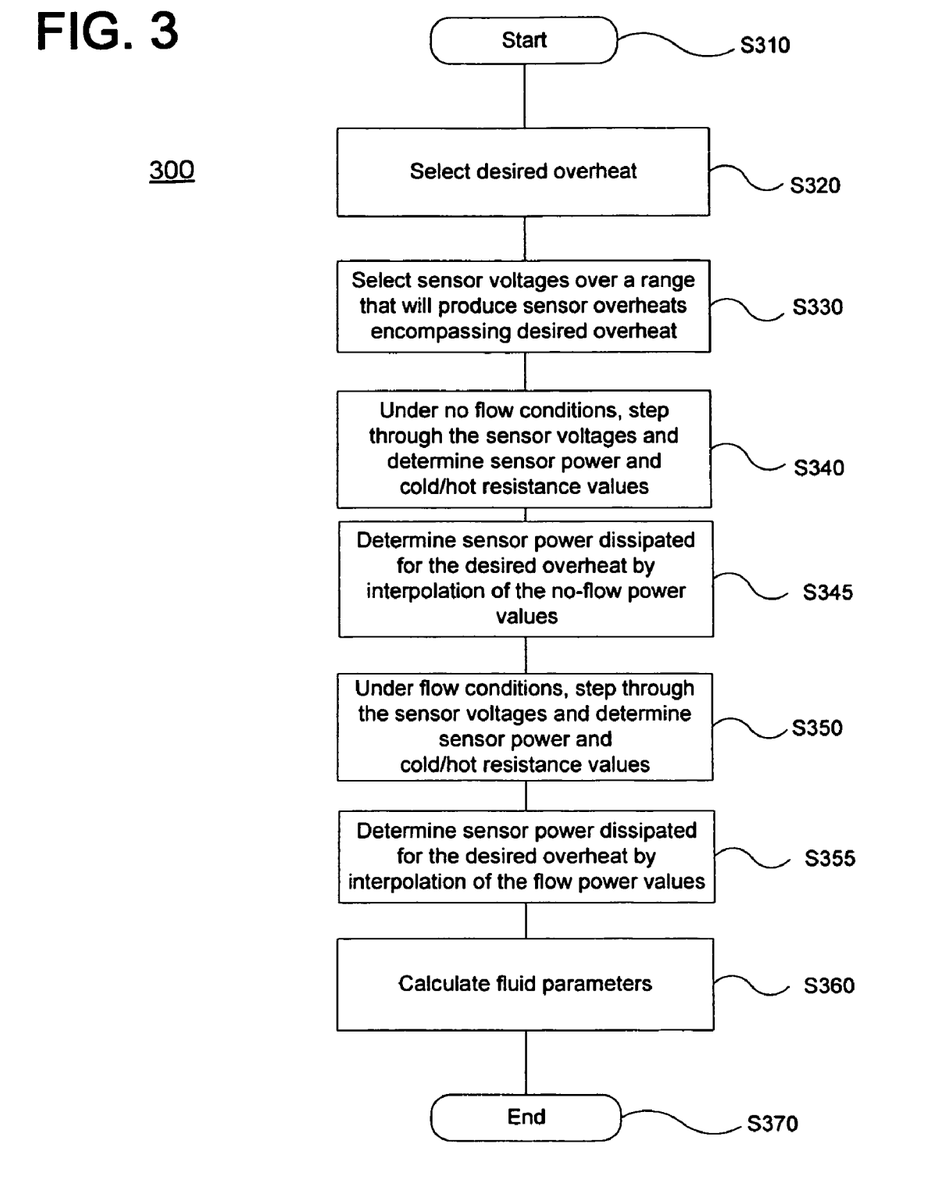
FIG. 3 illustrates a flow diagram of a method of obtaining a temperature-compensated flow measurement according to an embodiment of the invention.

FIG. 3 illustrates a flow diagram of another method 300 of obtaining a temperature-compensated flow measurement using a TCA system such as that described in FIG. 1. This method utilizes multiple overheats to calculate the shear stress. The method 300 begins at S310 and at S320 an overheat ratio is selected by the operator and communicated to the controller as in the previous method. At S330, a range of voltages across the sensor element settings from are selected such that when applied to the sensor element, the sensor resistance ranges from and. The sensor voltage range is chosen such that the desired overheat ratio is within the range of overheats produced by the range of sensor voltages.

At S340, the sensor voltage is stepped through $V_{w_1} \le V_{w_n}$ under no-flow conditions, producing $R_{w_1} \le R_{w_n}$ and $P_{w_1} \le P_{w_n}$. The cold resistance, $R_a$, may be estimated using one of the previously mentioned technique of obtaining an estimate of $R_w$ at zero $P_w$. With $R_a$, $R_{w_1} \le R_{w_n}$ and $P_{w_1} \le P_{w_n}$, $PDR0_1 \le PDR0_n$ can be estimated for each $a_{w_1} \le a_{w_n}$. PDR0 for the selected $a_w$ can then be obtained by interpolating $PDR0_1 \le PDR0_n$ at S345.

At S350, flow conditions are established and the sensor voltage is stepped through $V_{w_1} \le V_{w_n}$ producing $R_{w_1} \le R_{w_n}$ and $P_{w_1} \le P_{w_n}$. The cold resistance, $R_a$, is estimated using the previously mentioned technique of obtaining an estimate of $R_w$ at zero $P_w$. With $R_a$, $R_{w_1} \le R_{w_n}$ and $P_{w_1} \le P_{w_n}$, $PDR_1 \le PDR_n$ can be estimated for each $a_{w_1} \le a_{w_n}$. PDR for the selected $a_w$ can be obtained by interpolating $PDR_1 \le PDR_n$ at S355. Subtracting PDR0 from PDR at flow conditions eliminates the constant A in Eq. 3.

At S360, the fluid flow parameters are calculated. The calculated output, $(PDR-PDR0)^3$, is proportional to $\tau$, the shear stress, which can then be used to calculate other flow parameters. The method ends at S370. This technique is useful because the multiple overheats provides information regarding the boundary layer profile in addition to the shear stress.

Figure 4:
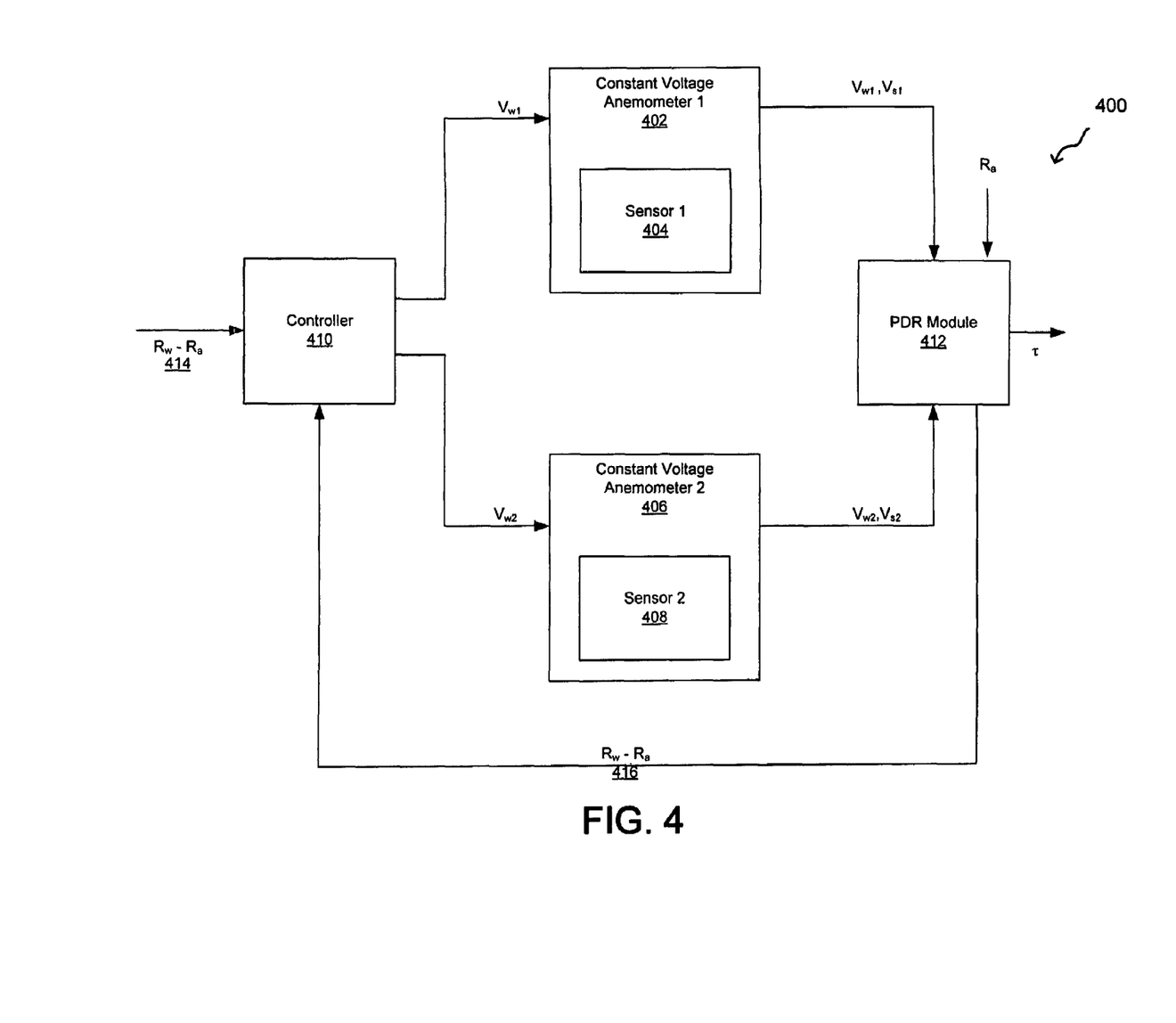
FIG. 4 is a schematic representation of a temperature-compensated sensor system according to an embodiment of the invention.

FIG. 4 illustrates a TCA system 400 according to an embodiment of the invention. The TCA system 400 has a controller 410, a first CVA 402 having a first sensor element 404, a second CVA 406 having a second sensor element 408, and a PDR module 412. In this TCA system the shear stress at a certain overheat is inferred by interpolating the output from two CVAs with occasional or no change of the voltage across each co-located sensor element.

The controller 410 may be configured to receive from an operator a desired overheat 414 ($R_w-R_a$) that is to be used as a reference to maintain the appropriate voltage across the first sensor element 404 and the second sensor element 408. The controller 410 may also be configured to determine a cold sensor element resistance value of the first sensor element 404 and the second sensor element 408 and to calculate the required sensor element hot resistances for the first sensor element and the second sensor element based on the overheat ($R_w-R_a$) 416 and the cold resistance values. The controller 410 may be further configured for determining the command voltage to be sent to the CVAs 402, 406. The controller may be any form of or a portion of any form of data processor and may, in particular, be a microprocessor. Each of the CVAs 402, 406 may be configured as described above for the system 100 of FIG. 1. The PDR module 412 may be configured to determine measured overheat as discussed below and provide the measured overheat to the controller 410 for use in updating the voltages to be applied across the sensor elements 404, 408. The PDR module 412 may be further configured to determine flow parameters based on measurements at flow and no-flow conditions.

Figure 5:
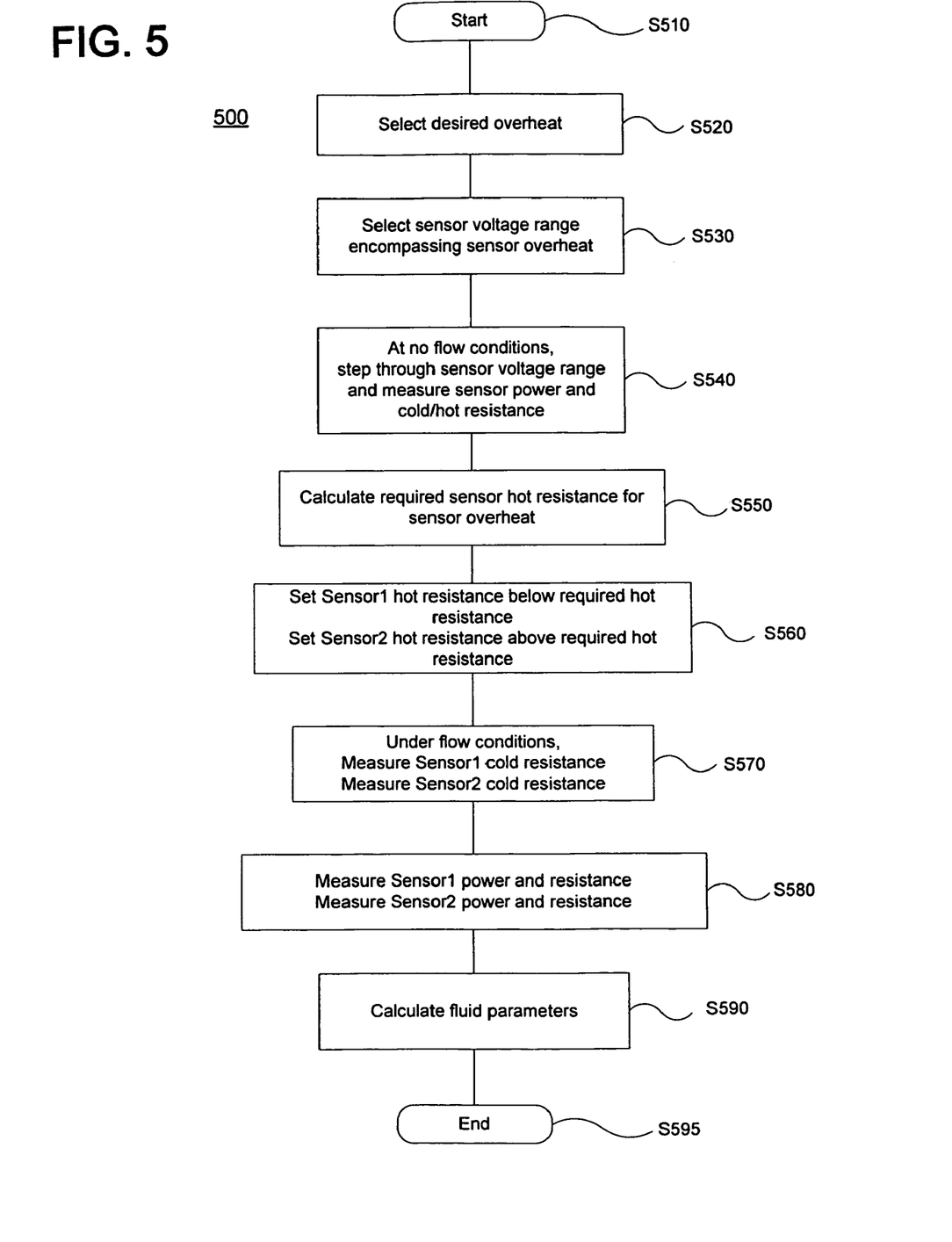
FIG. 5 illustrates a flow diagram of a method of obtaining a temperature-compensated flow measurement according to an embodiment of the invention.

FIG. 5 illustrates a method of obtaining a temperature-compensated flow measurement using a multiple CVA sensor system such as that shown in FIG. 4. For purposes of this discussion, the method utilizes a first CVA having a first sensor element and a second CVA having a second sensor element. In some embodiments, the co-located sensor elements are applied to surfaces of a body that can be immersed in a fluid stream. The method begins at S510 and at S520 an overheat ratio is selected by the operator and provided to the system. At S530, a range of voltages across the sensor element $V_w$ settings from $V_{w_1} \ldots V_{w_n}$ are selected such that when applied to the sensor element, the sensor resistance ranges from $R_{w_1} \ldots R_{w_n}$ and $\min(R_{w_1} \ldots R_{w_n}) < a_w R_a + R_a < \max(R_{w_1} \ldots R_{w_n})$. The sensor voltage range is chosen such that the desired overheat ratio is within the range of overheats produced by the range of sensor voltages. At S540, the sensor voltage is stepped through $V_{w_1} \ldots V_{w_n}$ under no-flow conditions, producing $R_{w_1} \ldots R_{w_n}$ and $P_{w_1} \ldots P_{w_n}$. The cold resistance, $R_a$, may be estimated using one of the previously mentioned technique of obtaining an estimate of $R_w$ at zero $P_w$. With $R_a$, $R_{w_1} \ldots R_{w_n}$ and $P_{w_1} \ldots P_{w_n}$, $PDR0_1 \ldots PDR0_n$ can be estimated for each $a_{w_1} \ldots a_{w_n}$. PDR0 for an $a_w$ can then be obtained by interpolating $PDR0_1 \ldots PDR0_n$. The hot resistances required to produce the desired overheat are then determined at S550.

At 560, the controller sets the voltage across the first sensor element and the voltage across the second sensor element such that:

$$\frac{R_{w_1} - R_{a_1}}{R_{a_1}} < a_w < \frac{R_{w_2} - R_{a_2}}{R_{a_2}} \qquad \text{(Eq. 4)}$$

At S570 the cold resistances are redetermined under flow conditions. At no flow conditions, the TCA system controller calculates PDR0 for Sensor1 and Sensor2 (calculated at S540). At S580 the power dissipated and the resistance values are redetermined under flow conditions using the overheat feedback method described above. After measuring the cold resistance for both sensors, under flow conditions, PDR is calculated for both sensors. At S590, the fluid parameters are determined. PDR for the selected overheat ratio can be obtained by interpolating PDR and PDR0 for Sensor1 and Sensor2. Subtracting PDR0 from PDR at flow conditions eliminates the constant A in Eq. 3. The calculated output, $(PDR-PDR0)^3$, is proportional to $\tau$, the shear stress. The advantage of this technique is that the CVAs run at full bandwidth and data at multiple overheats may be obtained for determining other fluid parameters. The method ends at S595.

The discussions above relate to TCA systems having one or two CVAs and one or two sensor elements. It will be understood, however, that the systems and methods described are not limited to a particular number of CVAs or sensor elements.

The effectiveness of the temperature compensation methods described herein may depend on several factors. First, if there are multiple sensor elements, the sensor elements should preferably be subjected to the same ambient temperature conditions and mounted to an exposed surface of a structure immersed in the flow field. Second, multiple sensors should preferably be subjected to substantially the same boundary conditions, e.g. substrate material and fluid. If the substrate material is substantially different, the a heat transfer model may be incorporated to compensate for the conduction. Third, for a single sensor at multiple overheats, the temperature may change slowly over the period in which the sensor voltage is varied. Finally, the shear stress is dependent on several fluid parameters, which may need to be compensated for separately. This invention focuses on obtaining a fluid measurement substantially independent of the temperature and heat loss through the substrate. The invention is not necessarily dependent on the problem formulation and the resulting derivative equations, e.g. Eq. 2. For example, another model may be developed that utilizes the actual heat flux to determine the heat convection to the flow. In this case, Eq. 2 would be substituted with an electrical-heat transfer model relating the resistance change of the sensor element, the actual heat flux and the ambient temperature to fluid parameters, such as shear stress.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

It will be understood that the present invention may be practiced by adding additional steps to the method, omitting steps within the process, and/or altering the order in which the steps are performed in the process.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A temperature compensating fluid flow sensing system comprising:
    a first resistance-based sensor element positionable in a fluid flow stream, the first sensor element having a sensor resistance that varies with fluid flow conditions based on heat transfer between the first sensor element and the fluid;
    a first constant voltage anemometer circuit including the first sensor element, the first constant voltage anemometer circuit being configured to establish and maintain a command voltage across the first sensor element and to provide a CVA output voltage corresponding to the resistance change in the first sensor element due to heat transfer between the first sensor element and the fluid;
    a controller in communication with the first constant voltage anemometer circuit, the controller being configured to establish the command voltage based on a desired overheat across the sensor and an actual overheat across the first sensor element; and
    a PDR module in communication with the first constant voltage anemometer circuit and the controller, the PDR module being configured to receive the CVA output voltage and the command voltage from the first constant voltage anemometer circuit, to determine at least one fluid flow parameter and an actual overheat value based at least in part on the CVA output voltage from the first constant voltage anemometer, and to transmit to the controller the actual overheat for use by the controller in updating the command voltage.

2. A sensing system according to claim 1 wherein the controller is configured to receive the desired overheat via operator input.

3. A sensing system according to claim 1 wherein the PDR module is configured to calculate the actual sensor overheat based on the desired overheat, the command voltage, the output voltage and a cold resistance of the sensor element.

4. A sensing system according to claim 1 wherein at least one of the set consisting of the controller, the PDR module, and a combination of the controller and the PDR module is configured for determining a cold resistance of the sensor element.

5. A sensing system according to claim 1 further comprising:
    a second resistance-based sensor element positionable in a fluid flow stream, the second sensor element having a sensor resistance that varies with fluid flow conditions based on heat transfer between the second sensor element and the fluid; and
    a second constant voltage anemometer circuit including the second sensor element, the second constant voltage anemometer circuit being configured to establish and maintain a command voltage across the second sensor element and to provide a CVA output voltage corresponding to the resistance change in the second sensor element due to heat transfer between the second sensor element and the fluid,
    wherein the controller is in communication with the second constant voltage anemometer circuit to provide the command voltage thereto, the controller being configured to establish the command voltage based on the desired overheat, the actual overheat across the first sensor element and an actual overheat across the second sensor element, and
    wherein the PDR module is in communication with the second constant voltage anemometer circuit and is configured to receive the CVA output voltage and the command voltage from the second constant voltage anemometer circuit, to use the CVA output voltage of the second constant voltage anemometer with the output of the first constant voltage anemometer to determine the at least one fluid flow parameter and the actual overheat value, and to calculate and transmit to the controller the actual overheat for use by the controller in updating the command voltage.

6. A sensing system according to claim 1 wherein the resistance-based sensor element is a thin film sensor appliable to a surface of an object that is immersable in the fluid flow stream.

7. A sensing system according to claim 6 wherein the fluid flow parameter is a shear stress at the object surface.

8. A method of determining a fluid flow parameter using a first resistance-based sensor element in a first constant voltage anemometer circuit, the first resistance-based sensor element being immersible in a fluid stream, the method comprising:
    selecting a desired sensor overheat for the first resistance-based sensor element;
    determining a zero-flow power dissipated value for the first sensor element for the desired sensor overheat;
    determining a flow power dissipated value for the first sensor element under a set of flow conditions for the desired sensor overheat; and calculating the fluid parameter at least in part based on the flow and zero-flow power dissipation values for the first sensor element.

9. A method according to claim 8 wherein the first resistance-based sensor element is a thin film sensor applied to a surface immersible in the fluid stream and the fluid flow parameter is a fluid shear stress at the surface.

10. A method according to claim 8 wherein the first resistance-based sensor element is a hot wire anemometer element.

11. A method according to claim 8 wherein:
the action of determining a zero-flow power dissipated value comprises
selecting a plurality of voltages to be applied to the first sensor element, the plurality of voltages defining a voltage range having an associated sensor overheat range, the voltages being selected to provide a sensor overheat range encompassing the desired sensor overheat;
for each of the plurality of voltages, establishing and maintaining the voltage across the first sensor element using the constant voltage anemometer circuit under no-flow conditions and determining an associated power dissipated value for the applied voltage; and
determining the zero-flow power dissipated value for the desired sensor overheat by interpolation using the sensor overheat values and the zero-flow power dissipated values associated with the plurality of voltages,
and the action of determining a flow power dissipated value comprises
for each of the plurality of voltages, establishing and maintaining the voltage across the first sensor element using the constant voltage anemometer circuit under the set of flow conditions and determining an associated power dissipated value for the applied voltage; and
determining the flow power dissipated value for the desired sensor overheat by interpolation using the sensor overheat values and the flow power dissipated values associated with the plurality of voltages.

12. A method according to claim 8 wherein:
the action of determining a zero-flow power dissipated value comprises
establishing and maintaining the desired sensor overheat across the first sensor element using the first constant voltage anemometer circuit under zero-flow conditions,
and the action of determining a flow power dissipated value comprises
establishing and maintaining the desired sensor overheat across the first sensor element using the first constant voltage anemometer circuit under the set of flow conditions.

13. A method according to claim 12 wherein:
the action of determining a zero-flow power dissipated value further comprises
determining a zero-flow cold resistance value for the first sensor element; and
calculating a required hot sensor resistance for the first sensor element for the desired sensor overheat,
and the action of determining a flow power dissipated value further comprises
determining a flow cold resistance value for the first sensor element under the set of flow conditions; and calculating a required hot sensor resistance for the first sensor element for the desired sensor overheat under the set of flow conditions.

14. A method according to claim 8 further comprising:
providing a second resistance-based sensor element in a constant voltage anemometer circuit, the second resistance-based sensor element being immersible in the fluid stream;
determining a zero-flow power dissipated value for the second sensor element for the desired sensor overheat; and
determining a flow power dissipated value for the second sensor element under the set of flow conditions for the desired sensor overheat,
wherein the fluid parameter is calculated based on the flow and zero-flow power dissipation values for both the first sensor element and the second sensor element.

15. A method according to claim 14 wherein:
the action of determining a zero-flow power dissipated value for the first sensor element comprises:
selecting a first plurality of voltages to be applied to the first sensor element, the plurality of voltages defining a voltage range having an associated sensor overheat range, the voltages being selected to provide a sensor overheat range encompassing the desired sensor overheat;
for each of the plurality of voltages, establishing and maintaining the voltage across the first sensor element using the constant voltage anemometer circuit under no-flow conditions and determining an associated power dissipated value for the applied voltage; and
determining the zero-flow power dissipated value for the desired sensor overheat by interpolation using the sensor overheat values and the zero-flow power dissipated values associated with the plurality of voltages,
the action of determining a zero-flow power dissipated value for the second sensor element comprises:
selecting a second plurality of voltages to be applied to the second sensor element, the plurality of voltages defining a voltage range having an associated sensor overheat range, the voltages being selected to provide a sensor overheat range encompassing the desired sensor overheat;
for each of the plurality of voltages, establishing and maintaining the voltage across the second sensor element using the constant voltage anemometer circuit under no-flow conditions and determining an associated power dissipated value for the applied voltage; and
determining the zero-flow power dissipated value for the desired sensor overheat by interpolation using the sensor overheat values and the zero-flow power dissipated values associated with the plurality of voltages,
the action of determining a flow power dissipated value for the first sensor element comprises
for each of the plurality of voltages, establishing and maintaining the voltage across the first sensor element using the constant voltage anemometer circuit under the set of flow conditions and determining an associated power dissipated value for the applied voltage; and
determining the flow power dissipated value for the first sensor for the desired sensor overheat by interpolation using the sensor overheat values and the flow power dissipated values associated with the plurality of voltages, and the action of determining a flow power dissipated value for the second sensor element comprises for each of the plurality of voltages, establishing and maintaining the voltage across the second sensor element using the constant voltage anemometer circuit under the set of flow conditions and determining an associated power dissipated value for the applied voltage; and determining the flow power dissipated value for the second sensor for the desired sensor overheat by interpolation using the sensor overheat values and the flow power dissipated values associated with the plurality of voltages.

16. A method according to claim 14 wherein:

the action of determining a zero-flow power dissipated value for the first sensor element comprises establishing and maintaining the desired sensor overheat across the first sensor element using the first constant voltage anemometer circuit under zero-flow conditions, the action of determining a zero-flow power dissipated value for the second sensor element comprises establishing and maintaining the desired sensor overheat across the second sensor element using the second constant voltage anemometer circuit under zero-flow conditions, the action of determining a flow power dissipated value for the first sensor element comprises establishing and maintaining the desired sensor overheat across the first sensor element using the first constant voltage anemometer circuit under the set of flow conditions, and the action of determining a flow power dissipated value for the second sensor element comprises establishing and maintaining the desired sensor overheat across the second sensor element using the second constant voltage anemometer circuit under the set of flow conditions.

17. A method according to claim 16 wherein:

the action of determining a zero-flow power dissipated value for the first sensor element further comprises determining a zero-flow cold resistance value for the first sensor element; and calculating a required hot sensor resistance for the first sensor element for the desired sensor overheat, the action of determining a zero-flow power dissipated value for the second sensor element further comprises determining a zero-flow cold resistance value for the second sensor element; and calculating a required hot sensor resistance for the second sensor element for the desired sensor overheat, the action of determining a zero-flow power dissipated value for the first sensor element further comprises determining a zero-flow cold resistance value for the first sensor element; and calculating a required hot sensor resistance for the first sensor element for the desired sensor overheat, the action of determining a zero-flow power dissipated value for the second sensor element further comprises determining a zero-flow cold resistance value for the second sensor element; and calculating a required hot sensor resistance for the second sensor element for the desired sensor overheat, and wherein the action of determining a flow power dissipated value further comprises determining a flow cold resistance value for the first sensor element under the set of flow conditions; and calculating a required hot sensor resistance for the first sensor element for the desired sensor overheat under the set of flow conditions.

18. A method of determining a fluid flow parameter using a plurality of resistance-based sensor elements each being included in an associated constant voltage anemometer circuit and being immersible in a fluid stream, the method comprising:

selecting a desired sensor overheat for the resistance-based sensor elements;

determining a zero-flow power dissipated value for each sensor element for the desired sensor overheat;

determining a flow power dissipated value for each sensor element under a set of flow conditions for the desired sensor overheat; and calculating the fluid parameter based on the flow and zero-flow power dissipation values for sensor elements.

* * * * *

UNITED STATES PATENT AND TRADEMARK OFFICE
CERTIFICATE OF CORRECTION

| | | |
|---|---|---|
| PATENT NO. | : 7,653,503 B2 | Page 1 of 1 |
| APPLICATION NO. | : 11/737831 | |
| DATED | : January 26, 2010 | |
| INVENTOR(S) | : Arun S. Mangalam and Siva M. Mangalam | |

It is certified that error appears in the above-identified patent and that said Letters Patent is hereby corrected as shown below:

Column 9, line 40, Claim 1 should read:
1. A temperature compensating fluid flow sensing system comprising:
a first resistance-based sensor element positionable in a fluid flow stream, the first sensor element having a sensor resistance that varies with fluid flow conditions based on heat transfer between the first sensor element and the fluid;
a first constant voltage anemometer circuit including the first sensor element, the first constant voltage anemometer circuit being configured to establish and maintain a command voltage across the first sensor element and to provide a <u>constant voltage anemometer (CVA)</u> ~~GVA~~ output voltage corresponding to the resistance change in the first sensor element due to heat transfer between the first sensor element and the fluid;

a controller in communication with the first constant voltage anemometer circuit, the controller being configured to establish the command voltage based on a desired overheat across the sensor and an actual overheat across the first sensor element; and a <u>power dissipation (PDR)</u> ~~PDR~~ module in communication with the first constant voltage anemometer circuit and the controller, the PDR module being configured to receive the CVA output voltage and the command voltage from the first constant voltage anemometer circuit, to determine at least one fluid flow parameter and an actual overheat value based at least in part on the CVA output voltage from the first constant voltage anemometer, and to transmit to the controller the actual overheat for use by the controller in updating the command voltage.

Signed and Sealed this
Twenty-second Day of March, 2011

David J. Kappos
*Director of the United States Patent and Trademark Office*